(12) United States Patent
Chung et al.

(10) Patent No.: US 10,563,896 B2
(45) Date of Patent: Feb. 18, 2020

(54) APPARATUS FOR CALIBRATING AND TESTING MULTIPLE SUPERHEAT CONTROLLERS

(71) Applicant: DunAn Microstaq, Inc., Austin, TX (US)

(72) Inventors: Buu C. Chung, Buda, TX (US); Wayne C. Long, Austin, TX (US); Arvind Rao, Austin, TX (US); Chen Yang, Austin, TX (US); Joseph Nguyen, Austin, TX (US); Joe A. Ojeda, Sr., Austin, TX (US); Colin B. Bingle, Austin, TX (US)

(73) Assignee: DunAn Microstaq, Inc., Austin, TX (US)

( * ) Notice: Subject to any disclaimer, the term of this patent is extended or adjusted under 35 U.S.C. 154(b) by 0 days.

(21) Appl. No.: 16/244,440

(22) Filed: Jan. 10, 2019

(65) Prior Publication Data

US 2019/0145679 A1 May 16, 2019

Related U.S. Application Data

(62) Division of application No. 15/238,834, filed on Aug. 17, 2016, now abandoned.

(60) Provisional application No. 62/237,155, filed on Oct. 5, 2015.

(51) Int. Cl.
*F25B 49/02* (2006.01)
*G01L 27/00* (2006.01)
*F25B 41/06* (2006.01)

(52) U.S. Cl.
CPC ............ *F25B 49/02* (2013.01); *F25B 41/062* (2013.01); *G01L 27/002* (2013.01); *F25B 2600/21* (2013.01); *F25B 2600/2513* (2013.01)

(58) Field of Classification Search
None
See application file for complete search history.

(56) References Cited

U.S. PATENT DOCUMENTS

| | | | |
|---|---|---|---|
| 6,279,402 B1 * | 8/2001 | Fisher | C23C 16/45557 73/754 |
| 9,140,613 B2 | 9/2015 | Arunasalam et al. | |
| 9,404,815 B2 | 8/2016 | Arunasalam et al. | |
| 2002/0078732 A1 * | 6/2002 | Bentley | G01D 18/008 73/1.88 |
| 2003/0177812 A1 * | 9/2003 | Joseph | G01L 27/005 73/1.71 |
| 2007/0107523 A1 * | 5/2007 | Galewski | G01L 9/0052 73/754 |
| 2008/0083263 A1 * | 4/2008 | Philipp | B01L 3/021 73/1.74 |
| 2010/0198545 A1 * | 8/2010 | Berg | G01L 21/00 702/98 |
| 2013/0243032 A1 * | 9/2013 | Arunasalam | G01K 13/02 374/143 |

(Continued)

*Primary Examiner* — Nathaniel T Woodward
(74) *Attorney, Agent, or Firm* — MacMillan, Sobanski & Todd, LLC

(57) ABSTRACT

A manifold assembly is configured to calibrate and test one or more superheat controllers and includes a manifold frame, a manifold having a plurality of fluid conduits mounted to the manifold frame, and a plurality of superheat controller fittings mounted to the fluid conduits, each superheat controller fitting configured to have a superheat controller attached thereto.

6 Claims, 8 Drawing Sheets

(56) References Cited

U.S. PATENT DOCUMENTS

2014/0352400 A1* 12/2014 Barrilado ............... B81B 7/008
 73/1.38
2015/0110148 A1 4/2015 Arunasalam et al.

* cited by examiner

APPARATUS FOR CALIBRATING AND TESTING MULTIPLE SUPERHEAT CONTROLLERS

BACKGROUND OF THE INVENTION

This invention relates in general to superheat controllers. In particular, this invention relates to an improved method and apparatus for simultaneously calibrating and/or testing pressure sensors within multiple superheat controllers.

U.S. Pat. No. 9,140,613 discloses a superheat controller (SHC). The SHC disclosed therein is a single, self-contained, stand-alone device which contains all the sensors, electronics, and intelligence to automatically detect a fluid type, such as refrigerant, and report the superheat of multiple common fluid types used in residential, industrial, and scientific applications. U.S. Pat. No. 9,140,613 is incorporated herein in its entirety.

FIGS. 5 and 6 herein illustrate a known SHC 10, which is similar to the superheat controller disclosed in U.S. Pat. No. 9,140,613. As shown in FIGS. 5 and 6, the illustrated embodiment of the SHC 10 includes a housing 12 having a body 14, a cover 16, and a fluid inlet member 18. The fluid inlet member 18 may be secured to the housing 12 by a mounting ring 19. The mounting ring 19 attaches the fluid inlet member 18 to the housing 12 portion by a threaded connection. Alternatively, the mounting ring 19 may be attached to the fluid inlet member 18 by any desired method, such as by welding or press fitting. In the embodiment illustrated in FIGS. 5 and 6, the fluid inlet member 18 is a brass fitting having a centrally formed opening that defines a sealing surface 20. When used in a known manner in a conventional heating, ventilating, air conditioning, and refrigeration (HVAC-R) system (not shown), the sealing surface 20 of the SHC 10 may engage a connector in the HVAC-R system to define a metal to metal seal.

Known superheat controllers include a pressure sensor as an integral component thereof. For example, the known SHC 10 includes an integrated pressure and temperature sensor 22 having pressure sensor portion 24 and a temperature sensor portion 26 mounted to a printed circuit board (PCB) 28. A superheat processor 30, a data-reporting or communication module 32, and an Input/Output (IO) module 34 are also mounted to the PCB 28. The IO module 34 is a physical hardware interface that accepts input power and reports data through available hard-wired interfaces, such as wires or cables 36, to the superheat processor 30. Target devices that may be connected to the SHC 10 via the IO module 34 are schematically illustrated at 38 in FIG. 6 and may include additional temperature sensors, laptop and notebook computers, cell phones, memory cards, and any device used in or with conventional end of the line test equipment. Alternatively, the target devices 38 may be connected to the communication module 32 by a wireless connection.

The superheat processor 30 is mounted to the PCB 28 and is a high-resolution, high accuracy device that processes the input signals from the pressure and temperature sensor portions 24 and 26, respectively, of the integrated pressure and temperature sensor 22, detects the fluid type, calculates the superheat of the fluid, and provides an output that identifies the level of the calculated superheat. The superheat processor 30 may also be configured to provide other data, such as fluid temperature, fluid pressure, fluid type, relevant historical dates maintained in an onboard memory (such as alarm and on-off history), and other desired information. Advantageously, the superheat processor 30 maintains a high level of accuracy over a typical operating range of pressure and temperature after a one-time calibration. Non-limiting examples of suitable superheat processors include microcontrollers, Field Programmable Gate Arrays (FPGAs), and Application Specific Integrated Circuits (ASICs) with embedded and/or off-board memory and peripherals.

In the known SHC 10, a pressure sensor or transducer, such as the pressure sensor portion 24, may be supplied in a non-calibrated condition, and thus the SHC 10 must be calibrated, such as within a conventional environmental chamber. A known calibration sequence for the SHC 10 requires that the SHC 10 be stabilized two different temperatures. At each of the two temperatures, the calibration sequence must be completed and stored at two different pressures. After the calibration is completed at the two pressures at each of the two temperatures, the SHC 10 is returned to a verification temperature, typically room temperature, and the accuracy of the calibration is verified at a plurality of pressure points, such as five pressure points.

Typically, the time required to stabilize the SHC 10 at each of the two calibration temperatures and at the verification temperature is about one and one half hours (1.5 hrs). Although the time required to stabilize the SHC 10 at each of the two calibration temperatures and at the verification temperature will vary with the type and characteristics of the environmental chamber used, the time may be within the range of about 1.0 hours to about 2.0 hours. The time required to perform the calibration sequence and to store the results in the SHC 10 may be about 10 minutes. Thus, most of the time required for calibration and verification is spent in reaching and stabilizing the SHC 10 at the two calibration temperatures and at the verification temperature. For example, the time required to individually calibrate and verify 25 SHCs 10 in a known manner is approximately 79 hours.

Thus, it would be desirable to provide an improved method and apparatus for simultaneously calibrating pressure sensors within multiple superheat controllers.

SUMMARY OF THE INVENTION

This invention relates to an improved method and apparatus for simultaneously calibrating and/or testing pressure sensors within multiple superheat controllers. In one embodiment, a manifold assembly is configured to calibrate and test one or more superheat controllers and includes a manifold frame, a manifold having a plurality of fluid conduits mounted to the manifold frame, and a plurality of superheat controller fittings mounted to the fluid conduits, each superheat controller fitting configured to have a superheat controller attached thereto.

In a second embodiment, a pressure-calibration stand is configured to calibrate and test a plurality of superheat controllers and includes an environmental chamber, a computer, a source of pressurized gas, and a power supply. A first data acquisition module has a pressure gauge therein, and a second data acquisition module is connected to a temperature sensor within the environmental chamber. An air regulator includes a filter and is mounted between the source of pressurized gas and the first data acquisition module. A manifold assembly is configured to be mounted within the environmental chamber and includes a manifold frame and a manifold having a plurality of fluid conduits mounted to the manifold frame and connected to the source of pressurized gas. A gas line connector is attached to an inlet end of the manifold and is configured for attachment to a source of pressurized gas, and a pressure transducer is attached to an outlet end of the manifold and is configured to sense or measure gas pressure within the fluid conduits of the manifold. A plurality of superheat controller fittings is mounted to the fluid conduits, and each superheat controller fitting is configured to have a superheat controller attached thereto. Each superheat controller fitting is a male fitting having an O-ring mounted about an outside surface at an open end thereof, and the O-ring defines a fluid tight seal between the superheat controller fitting and a sealing surface of a fluid inlet member of the superheat controller.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
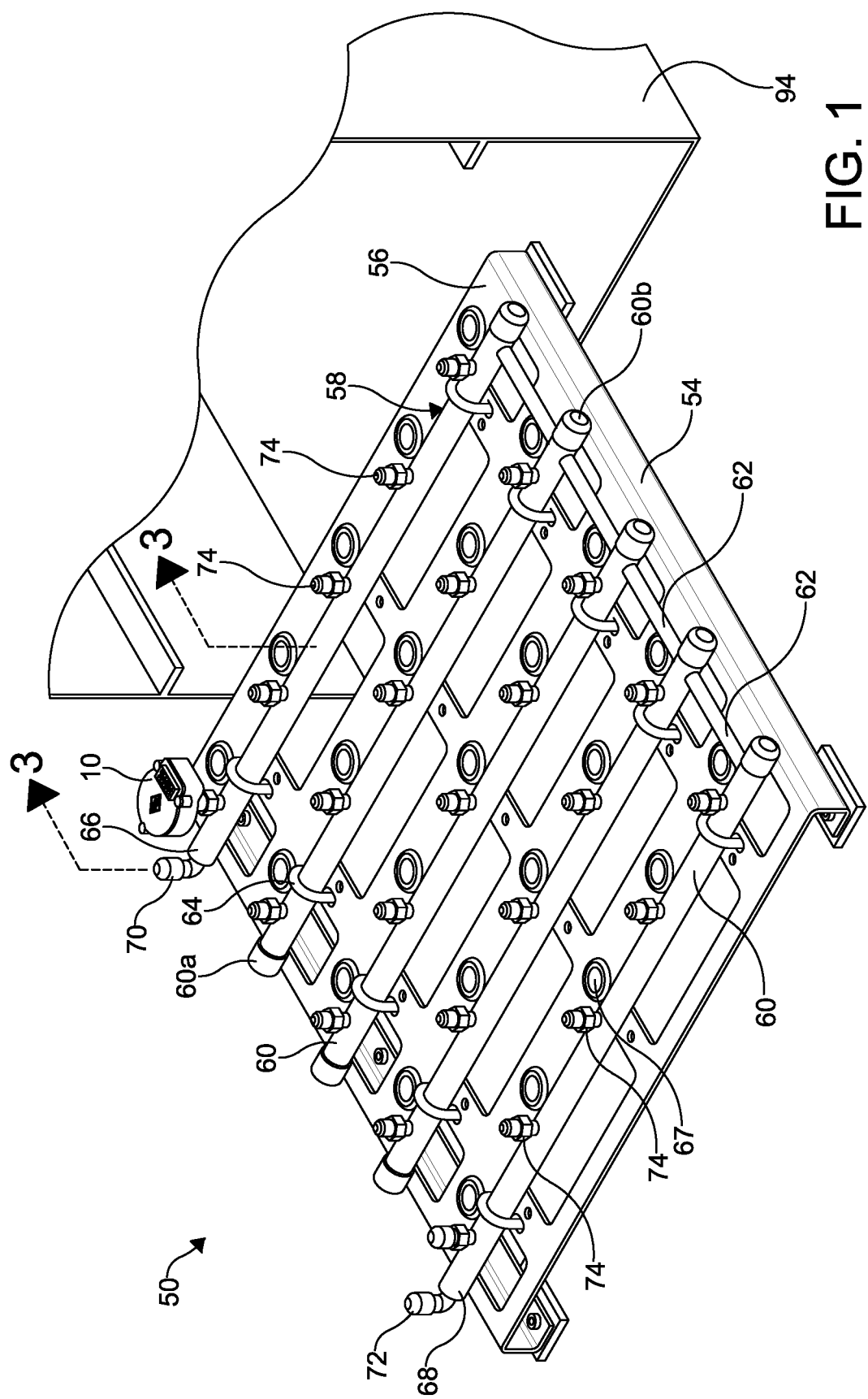
FIG. 1 is a perspective view of an improved manifold assembly in accordance with this invention.
Figure 2:
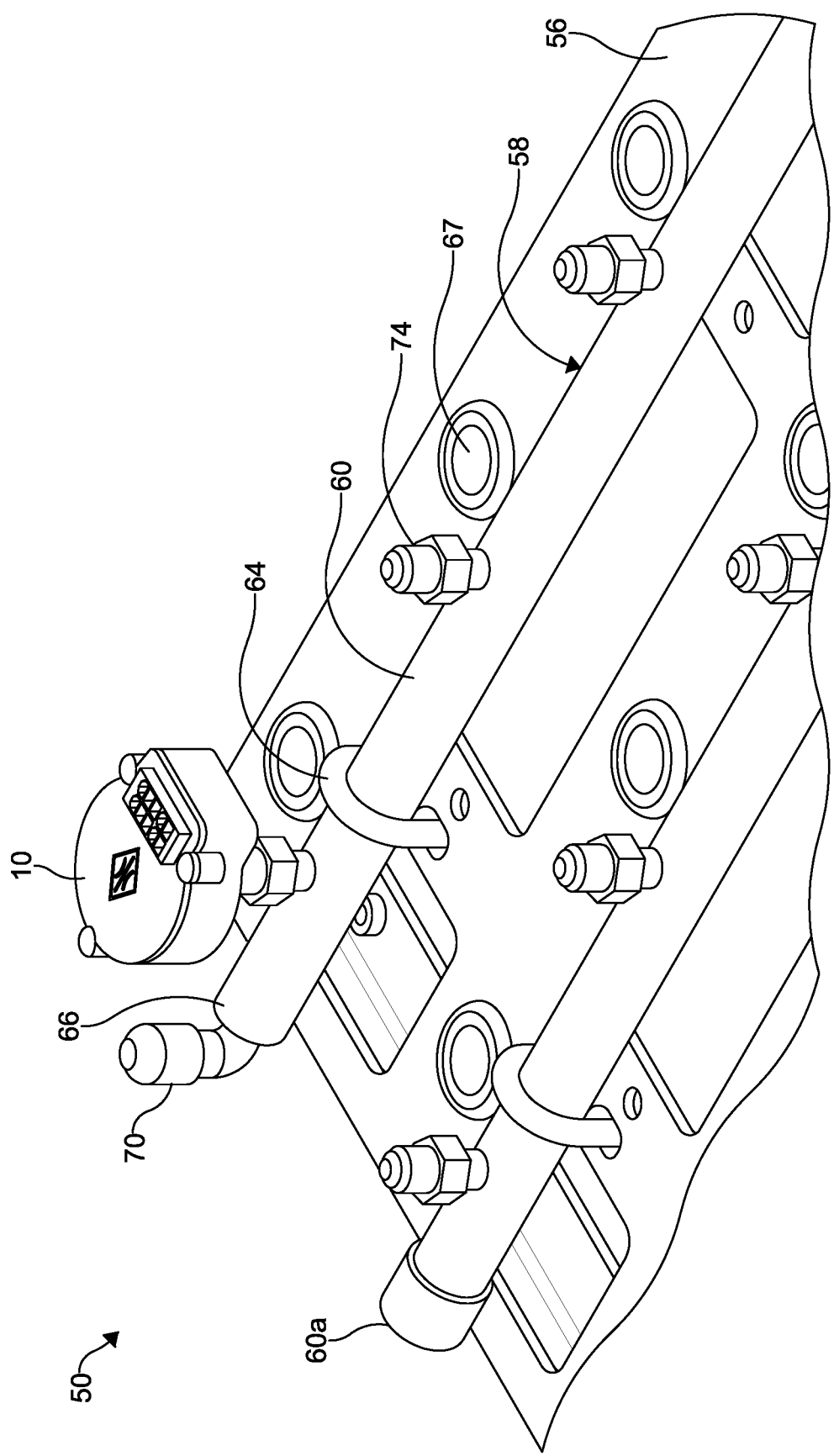
FIG. 2 is an enlarged perspective view of a portion of the manifold assembly illustrated in FIG. 1.
Figure 3:
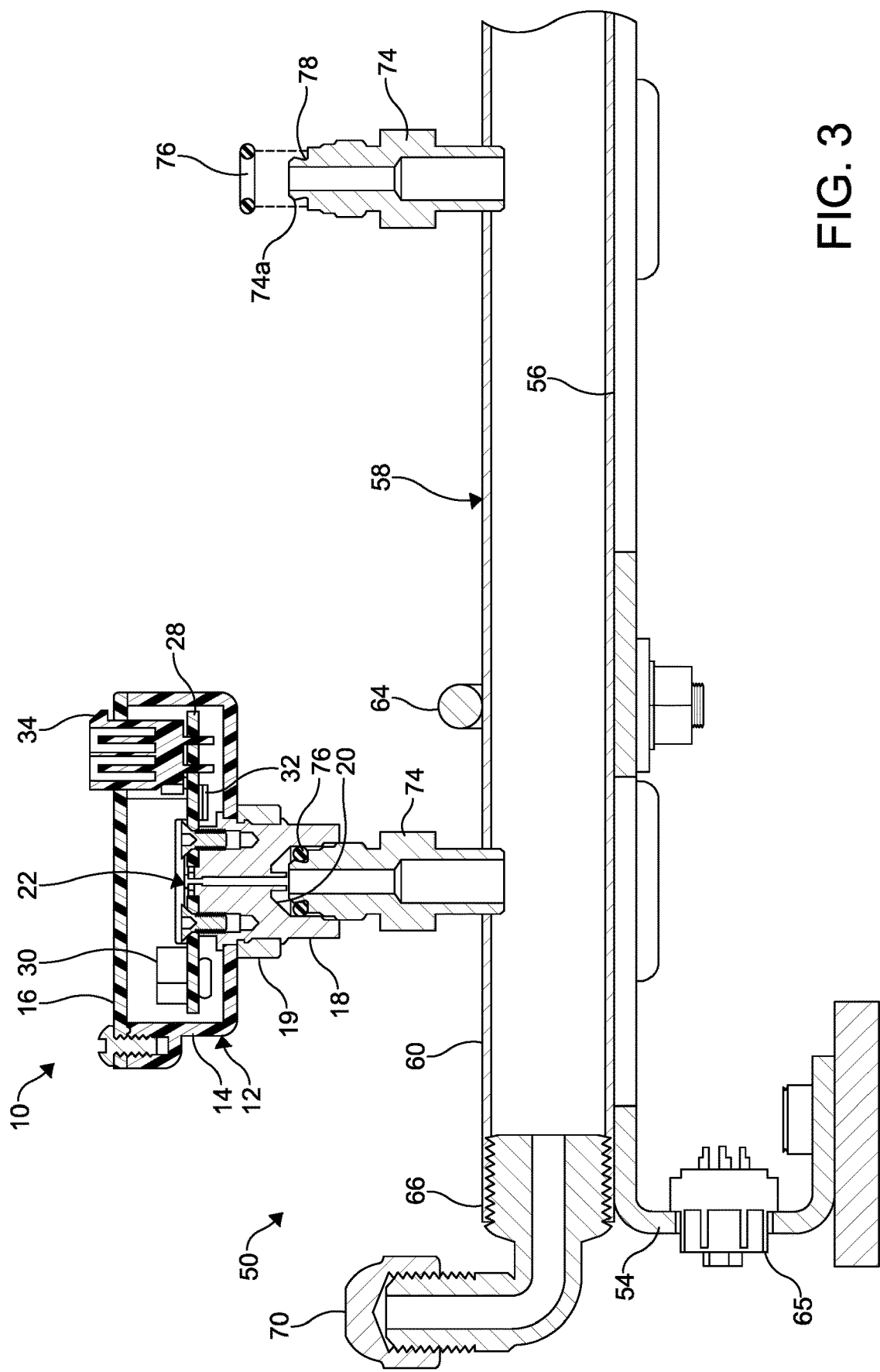
FIG. 3 is an elevational view in cross-section of a portion of the manifold assembly illustrated in FIGS. 1 and 2 showing a superheat controller attached to an improved superheat controller fitting.
Figure 5:
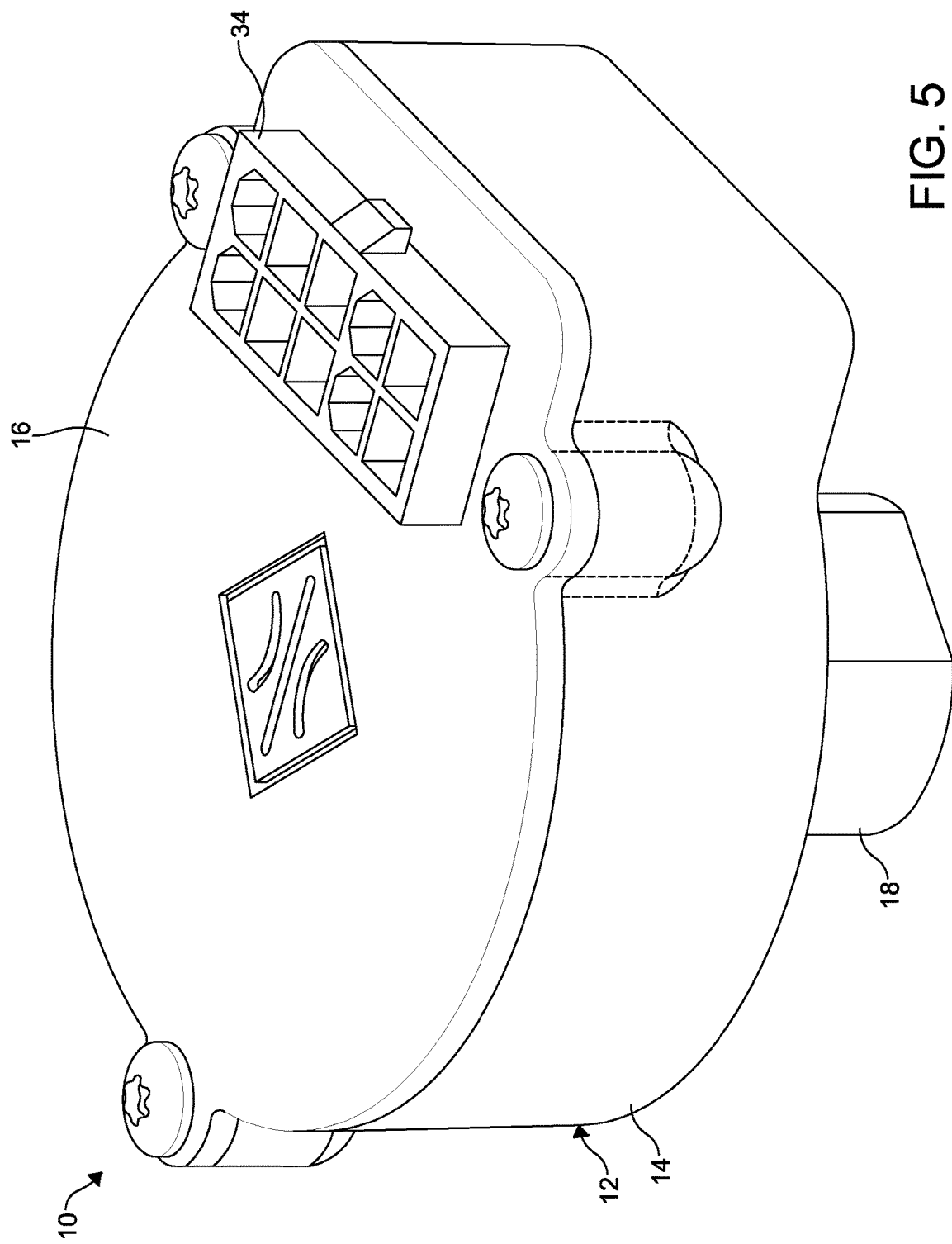
FIG. 5 is a perspective view of the known universal superheat controller.
Figure 6:
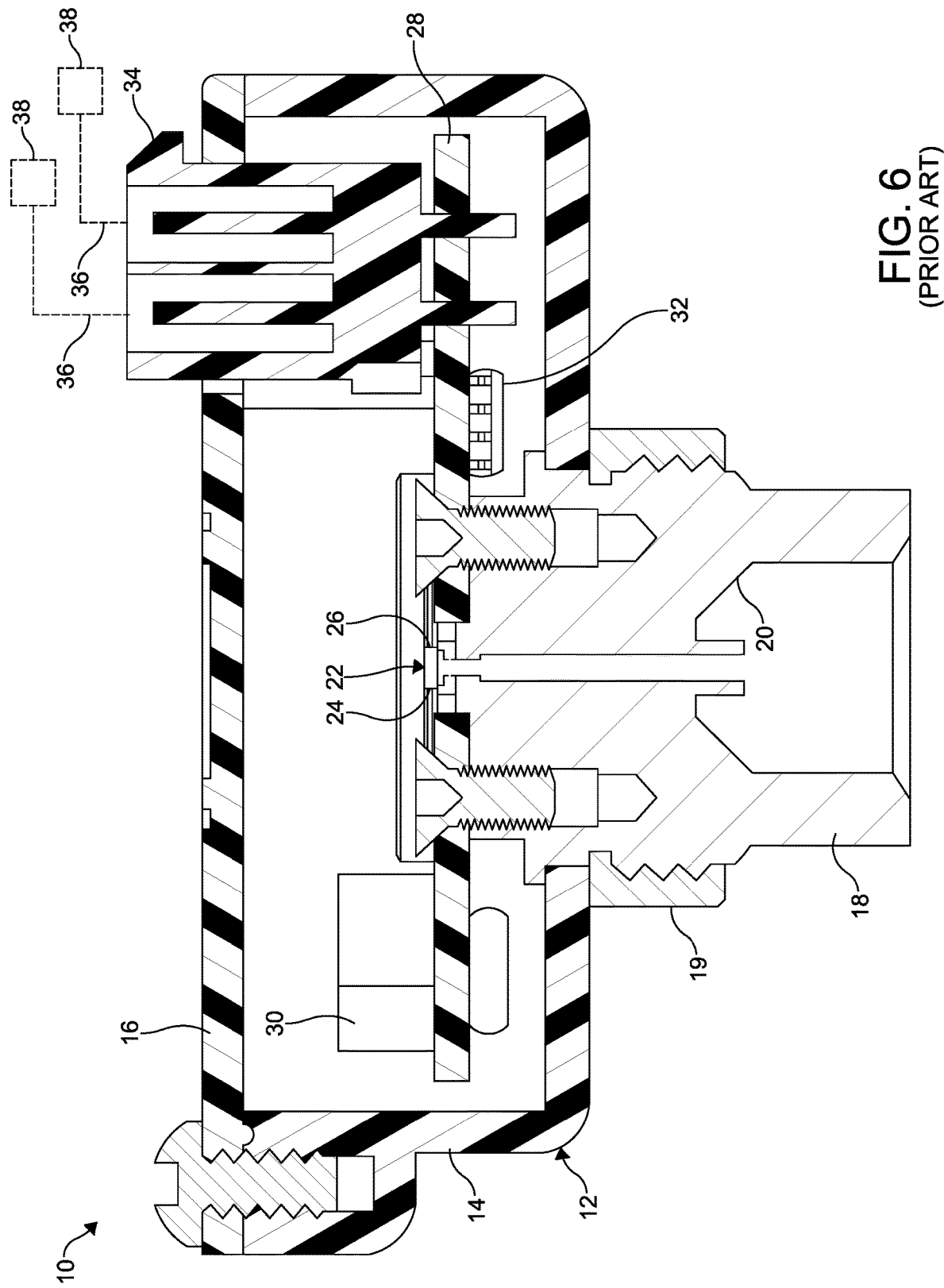
FIG. 6 is a cross sectional view of the known universal superheat controller illustrated in FIG. 5.

Referring now to the drawings, there is illustrated in FIGS. 1 through 3 a basic structure of an improved manifold assembly 50 configured to simultaneously calibrate, verify, and/or test pressure sensors or transducers within multiple superheat controllers (SHCs) 10. The SHCs 10 may be any desired SHC, such as the SHC 10 illustrated in FIGS. 5 and 6, any one of the embodiments of the SHCs disclosed in U.S. Pat. No. 9,140,613, other SHC, other pressure sensors, or other devices having pressure sensors as a component thereof.

The manifold assembly 50 includes a manifold frame 54 having a mounting surface 56. A manifold 58 is attached to the mounting surface 56 and includes a plurality of fluid conduits 60. Each of the fluid conduits 60 has a first end 60a and a second end 60b, and the fluid conduits 60 are connected to one another by connecting fluid conduits 62 at their second ends 60b. The fluid conduits 60 are attached to the mounting surface 56 by any desired means, such as by a plurality of substantially U-shaped mounting brackets 64. One or more electrical connectors 65, such as a 50-pin flat ribbon cable connector, may be mounted to the manifold frame 54. In the illustrated embodiment, each manifold assembly has five electrical connectors 65. Alternatively, each manifold assembly may have any desired number of electrical connectors 65. The electrical connectors 65 electrically connect the manifold assembly 50 to one or more power supplies 96 (see FIG. 4), described below.

A plurality of openings 67 are formed through the mounting surface 56 of the manifold frame 54. Each opening 67 defines a passageway for electrical wires (not shown), computer cables (not shown), and the like that are connected to each SHC 10.

In the illustrated embodiment, the fluid conduits 60 are formed from copper. Alternatively, the fluid conduits 60 may be formed from any desired material, such as stainless steel, and other metals, alloys, and composite materials. The illustrated fluid conduits 60 may be substantially tubular and have a diameter of about 5/8 in. (about 1.58 cm). Alternatively, the fluid conduits 60 may have any desired diameter, such as for example, a diameter less than about 5/8 in. (about 1.58 cm), between about 5/8 in. (about 1.58 cm) and about 3/4 in. (about 1.9 cm), and greater than about 3/4 in. (about 1.9 cm). The illustrated manifold frame 54 is formed from aluminum. Alternatively, the manifold frame 54 may be formed from any desired material, such as brass, copper, stainless steel, and other metals, alloys, and composite materials.

The manifold 58 includes a first or inlet end 66 and a second or outlet end 68. The inlet end 66 includes a gas line connector 70 attached thereto. The connector 70 is configured for attachment to a source of pressurized gas 88 (see FIG. 4), such as nitrogen or dry and filtered air, that will be introduced into the manifold 58. A pressure transducer 72 is attached to the outlet end 68 of the manifold 58 and may be configured to sense and measure gas pressure within the fluid conduits 60 of the manifold 58 in a known manner.

A plurality of improved SHC connectors or fittings 74 are mounted to the fluid conduits 60 of the manifold 58. Each SHC 10 to be calibrated and verified may be attached to one of the fittings 74. As shown in FIG. 1, the manifold assembly 50 includes five fluid conduits 60, and each fluid conduit 60 has five fittings 74. The manifold assembly 50 is thus configured to simultaneously calibrate up to 25 SHCs 10. Alternatively, the manifold assembly 50 may be configured with any desired number of fittings 74. The number of fittings 74 may be limited by factors such as a combined length of the fluid conduits 60 and the ability to supply pressurized gas therethrough, and a size of an environmental chamber 94, described below, within which the SHCs 10 will be calibrated, verified, and/or tested.

Although 25 SHCs 10 may be attached to the fittings 74 of the manifold 58, it will be understood that any desired number of SHCs 10, such as between one SHC 10 and 25 SHCs 10 may be attached to the manifold 58.

When used in a known manner in a conventional HVAC-R system (not shown), the SHC 10 may be attached to a connector in the HVAC-R system with a metal to metal seal. Such a metal to metal seal is conventional in the art and is provided to prevent refrigerant leakage over the life of the SHC 10. However, such metal to metal contact between the SHC 10 and a calibration or test apparatus may undesirably damage the sealing surface 20 of the SHC 10.

Thus, in the illustrated manifold assembly 50, each fitting 74 is configured as a male fitting that includes an O-ring 76 seated within a circumferential groove 78 formed near an open end 74a of the fitting 74. Advantageously, the O-ring 76 of the fitting 74 provides a fluid-tight seal between the fitting 74 and the sealing surface 20 within the fluid inlet member 18 of each attached SHC 10 without causing damage to the SHC sealing surface 20. Additionally, use of the O-rings 76 on the fittings 74 further extends the life of the manifold assembly 50 by reducing wear on the fittings 74 as SHCs 10 are attached and detached therefrom over time.

By using the manifold assembly 50 to simultaneously calibrate and verify 25 SHCs 10, the total time required to calibrate and verify 25 of the SHCs 10 is about 14.5 hours, including the time spent at each of two calibration temperatures T1 and T2 described below and a wait time between each of the two calibration temperatures T1 and T2. This is a significant improvement over the approximately 79 hours required to individually calibrate and verify 25 of the SHCs 10.

If desired, two or more of the manifold assemblies 50 may be connected together, thus allowing 50 or more of the SHCs 10 to be simultaneously calibrated and verified. It will be understood that the number of manifold assemblies 50 that may be connected together may be limited by factors such as the size of the environmental chamber within which the SHCs 10 will be calibrated and verified and the ability to supply a desired volume of pressurized gas to the connected manifold assemblies 50.

Figure 4:
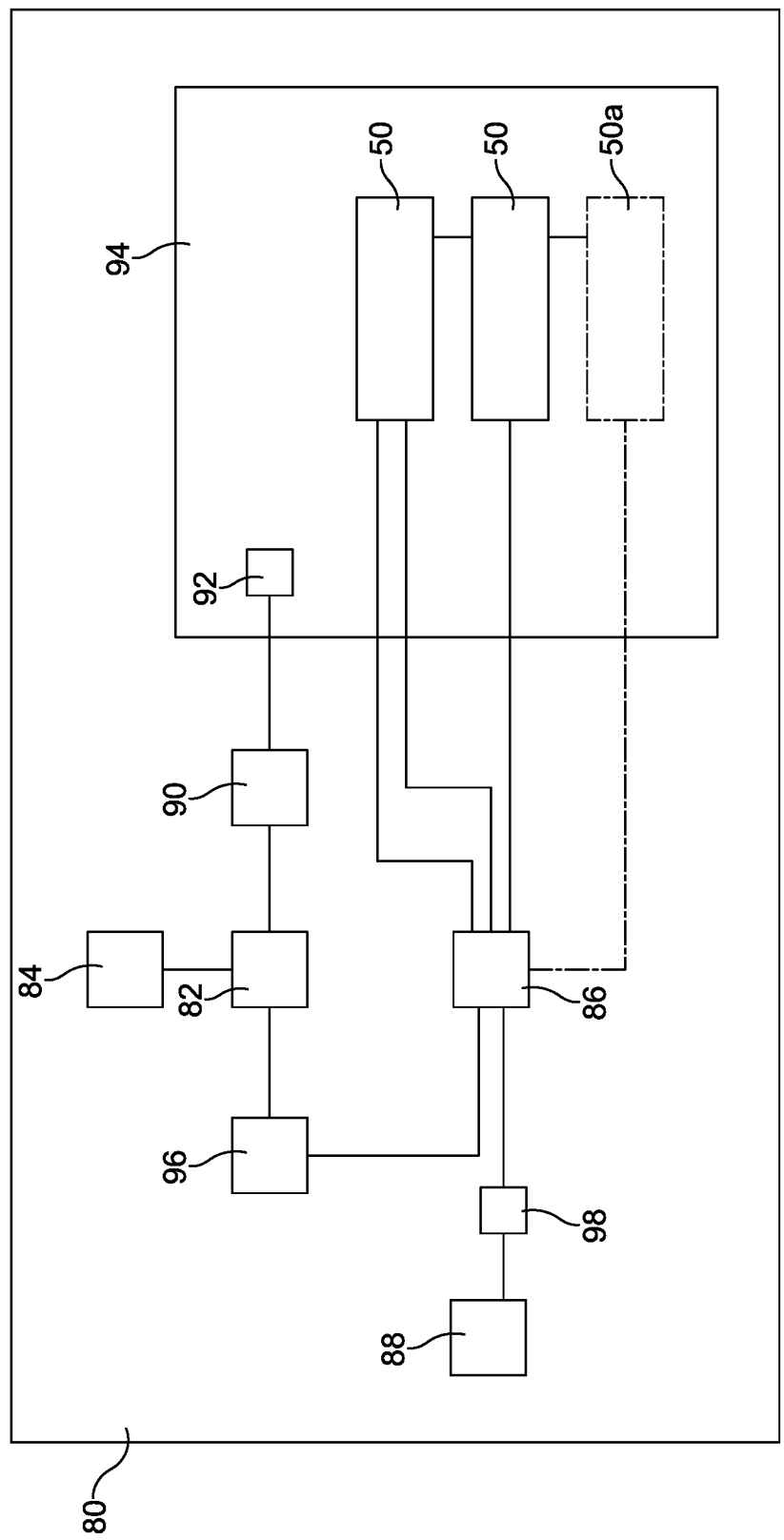
FIG. 4 is a block diagram illustrating a pressure-calibration stand having two of the manifold assemblies illustrated in FIG. 1.

Referring to FIG. 4, two manifold assemblies 50 are shown as components of a pressure-calibration (PCAL) stand 80. If desired, additional manifold assemblies 50 may be added to the PCAL stand 80, as shown at 50a. As shown in FIG. 4, the PCAL stand 80 may include a computer 82 and an associated monitor 84 connected to a first data acquisition module 86 having a digital pressure gauge (not shown) therein. A source of pressurized gas 88 may be provided to supply pressurized gas to the manifold assemblies 50. The first data acquisition module 86 may also be electrically connected to each SHC 10 of each manifold assembly 50. The computer 82 may be connected to a second data acquisition module 90. The second data acquisition module 90 may be further connected to a thermocouple 92 or other temperature sensor within an environmental chamber 94 within which the SHCs 10 will be calibrated, verified, and/or tested. The PCAL stand 80 may also include an air regulator and filter 98 mounted between the source of pressurized gas 88 and the first data acquisition module 86, a central relay control board (not shown), and one or more of the power supplies 96.

In operation, each SHC 10 to be calibrated and verified may be attached to an improved fitting 74 on one or more manifold assemblies 50. The manifold assemblies 50 may then be enclosed within the environmental chamber 94, and a PCAL and verification method as shown in FIG. 7 may be started.

In the improved PCAL and verification method described and illustrated herein, up to 25 of the SHCs 10 may be attached to the 25 fittings 74 on the manifold assembly 50. One or more of the manifold assemblies 50, each having up to 25 of the SHCs 10 attached thereto, may be mounted within the environmental chamber 94 and connected to the various components of the PCAL stand 80, including the source of pressurized gas 88, the power supply 96, and the various other components illustrated in FIG. 4. The environmental chamber 94 may then be closed and sealed.

Figure 7:
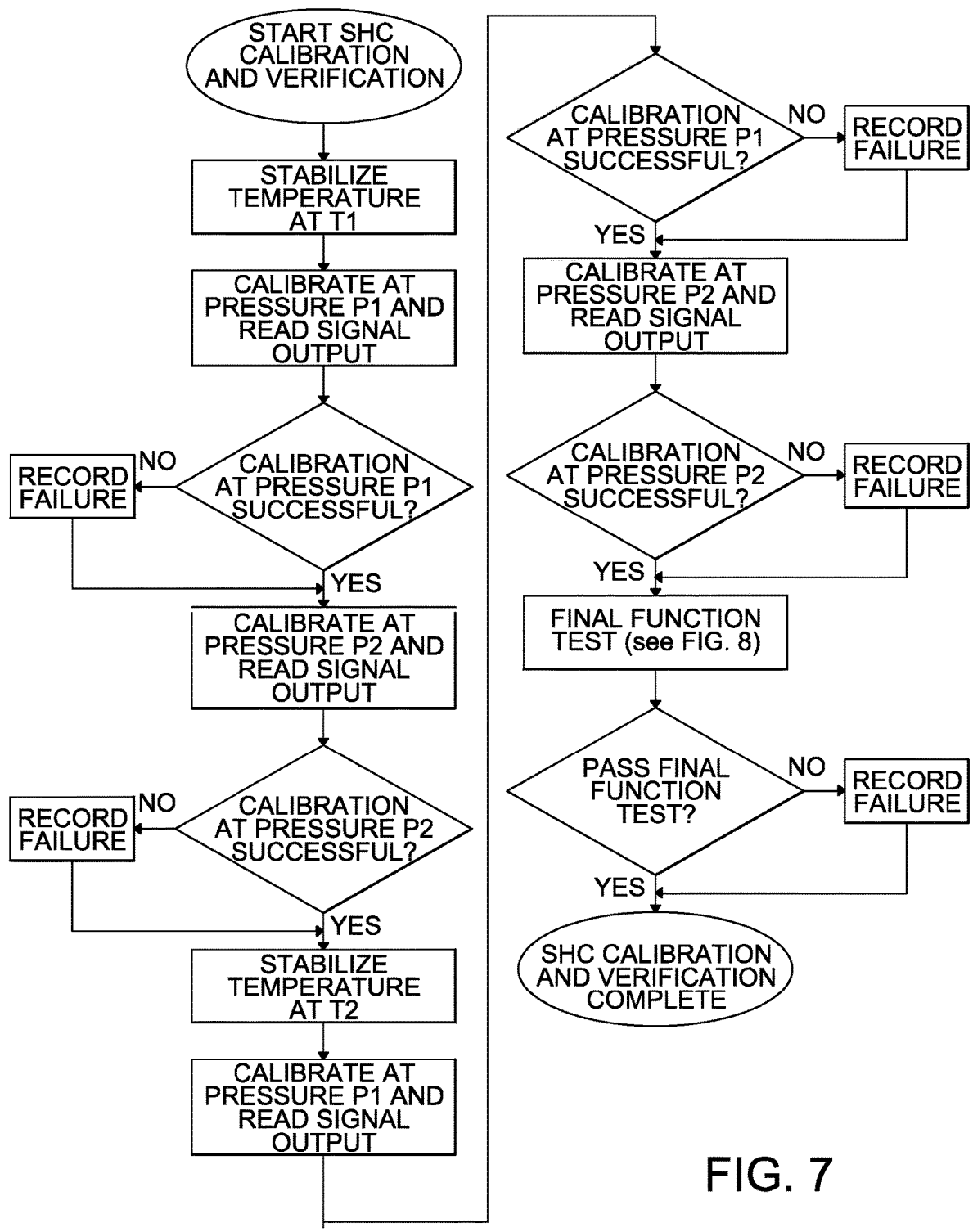
FIG. 7 is a diagram illustrating the improved pressure calibration and verification method in accordance with this invention.

In a first step of the improved PCAL and verification method shown in FIG. 7, the temperature within the environmental chamber 94 is stabilized at a first temperature T1, which may, for example be about −38° C. When the temperature within the environmental chamber 94 is stabilized at the first temperature T1, pressurized gas may be introduced into the manifold assembly 50 at a first pressure P1, which may, for example be about 60 psi. An output signal of the pressure sensor, such as the pressure sensor portion 24 of the integrated pressure and temperature sensor 22, may be read. If the SHC 10 fails to calibrate at the first temperature T1 and the first pressure P1, the failure may be recorded. If the SHC 10 is successfully calibrated at the first temperature T1 and the first pressure P1, the success may also be recorded.

In a second step of the improved PCAL and verification method, and while the environmental chamber 94 is stabilized at the first temperature T1, pressurized gas may be introduced into the manifold assembly 50 at a second pressure P2, which may, for example be about 200 psi. The output signal of the pressure sensor portion 24 may again be read. If the SHC 10 fails to calibrate at the first temperature T1 and the second pressure P2, the failure may be recorded. If the SHC 10 is successfully calibrated at the first temperature T1 and the second pressure P2, the success may also be recorded.

In a third step of the improved PCAL and verification method, the temperature within the environmental chamber 94 is stabilized at a second temperature T2, which may, for example be about 40° C. When the temperature within the environmental chamber 94 is stabilized at the second temperature T2, pressurized gas may be introduced into the manifold assembly 50 at the first pressure P1. The output signal of the pressure sensor portion 24 may be read. If the SHC 10 fails to calibrate at the second temperature T2 and the first pressure P1, the failure may be recorded. If the SHC 10 is successfully calibrated at the second temperature T2 and the first pressure P1, the success may also be recorded.

In a fourth step of the improved PCAL and verification method, and while the environmental chamber 94 is stabilized at the second temperature T2, pressurized gas may be introduced into the manifold assembly 50 at the second pressure P2. The output signal of the pressure sensor portion 24 may again be read. If the SHC 10 fails to calibrate at the second temperature T2 and the second pressure P2, the failure may be recorded. If the SHC 10 is successfully calibrated at the second temperature T2 and the second pressure P2, the success may also be recorded.

Figure 8:
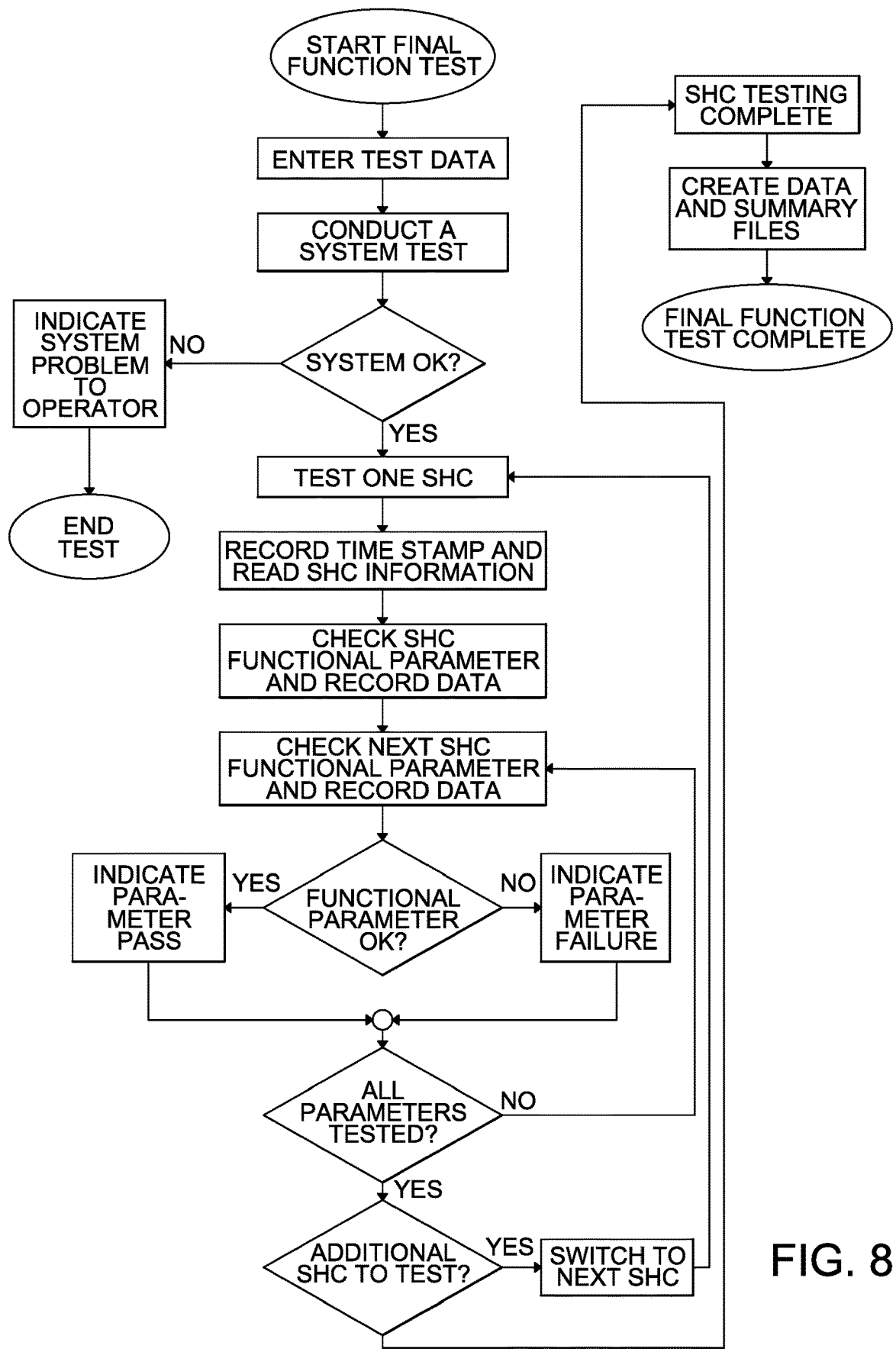
FIG. 8 is a diagram illustrating the final function test portion of the improved pressure calibration and verification method illustrated in FIG. 7.

As shown in FIG. 8 and described in detail below, a final function test to verify calibration may then be performed on the SHCs 10 attached to the manifold assemblies 50.

In addition to the temperatures and pressures described above, the first temperature T1 may be any desired temperature, such as within the range of about −40° C. to about 0° C., and the second temperature T2 may be any desired temperature, such as within the range of about 25° C. to about 125° C. Similarly, the first pressure P1 may be any desired pressure, such as within the range of about 0 psi to about 80 psi, and the second pressure P2 may be any desired pressure, such as within the range of about 20 psi to about 700 psi.

The temperatures T1 and T2 may be determined based on an operating temperature of the system within which the SHC 10 will be used. Similarly, the pressures P1 and P2 may be determined based on an operating pressure of the system within which the SHC 10 will be used. The desired temperatures T1 and T2 may be maintained within the range of about +/−1.5° C., and the desired pressures P1 and P2 may be maintained within the range of about +/−2 psi. Upon completion of the PCAL steps at the first and second pressures P1 and P2 at each of the first and second temperatures T1 and T2, the manifold assemblies 50 may be removed from the environmental chamber 94 and allowed to stabilize at room temperature, i.e., within the range of about 20° C. to about 26° C. Prior to beginning the final function test, predetermined test data, such as temperatures, pressures, durations of tests, a manifold assembly 50 identification number, and a PCAL stand 80 identification number, may be entered into the computer 82 of the PCAL stand 80.

In a first step of the final function test, an operator may enter dynamic test data, including but not limited to the operator's initials or other identification, the number of SHCs 10 to be tested, and identifying information for each SHC 10, such as the date of manufacture and a lot number, into the computer 82 of the PCAL stand 80. The operator may then perform a system test on the PCAL stand 80. For example, the operator may perform a communications check and a pressure check. If the PCAL stand 80 fails the system test, the final function test of the SHCs 10 may be terminated. An operator may be notified of a failed system test by a failure message displayed on the monitor 84. Alternatively, the operator may be notified of the system test failure by other methods, such as for example a visual signal or an audible signal.

Second and third steps of the final function test may then be performed on each SHC 10 one at a time. In the second step of the final function test, a time stamp and identifying information may be read from the superheat processor 30 within the SHC 10 being tested. The identifying information may include a firmware version, a serial number, a manufacturing identification number, and an identification number of the PCB 28.

In the third step of the final function test, functional test parameters of the SHC 10 may be checked and the results are recorded. Such functional parameters include, but are not limited to, internal DC and AC voltage, communication level, thermister values, pressure accuracy, zero cross timing, valve resistance, and valve duty cycle control. The check of each test parameter in the third step may be performed at a plurality of pressures. For example, the third step may be performed at each of six pressures. The number and value of the plurality of pressures may be determined based on a desired level of accuracy for the SHC 10 being tested.

Upon completion of the third step on a first of the SHCs 10, the test results are recorded, and the computer 82 may then perform the second and third steps on a second SHC 10. This method is continued until final function test is performed on all of the SHCs 10 attached to each of the manifold assemblies 50.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A manifold assembly configured to calibrate and test one or more superheat controllers comprising:
    a manifold frame;
    a manifold having a plurality of fluid conduits mounted to the manifold frame; and
    a plurality of superheat controller fittings mounted to the fluid conduits, each superheat controller fitting configured to have a superheat controller attached thereto;
    wherein each superheat controller fitting is a male fitting having an O-ring mounted about an outside surface at an open end thereof, and wherein the O-ring defines a fluid tight seal between the superheat controller fitting and a sealing surface of a fluid inlet member of the superheat controller.

2. The manifold assembly according to claim 1, wherein the manifold includes a plurality of fluid conduits connected to one another by connecting fluid conduits.

3. The manifold assembly according to claim 2, wherein the manifold includes a gas line connector attached to an inlet end thereof and configured for attachment to a source of pressurized gas.

4. The manifold assembly according to claim 3 wherein the manifold includes a pressure transducer attached to an outlet end thereof and configured to one of sense and measure gas pressure within the fluid conduits of the manifold.

5. The manifold assembly according to claim 1, wherein the manifold frame includes an electrical connector configured to connect each superheat controller to a source of electrical power.

6. A pressure-calibration stand configured to calibrate and test a plurality of superheat controllers comprising:
    an environmental chamber;
    a computer;
    a source of pressurized gas;
    a first data acquisition module having a pressure gauge therein;
    a second data acquisition module connected to a temperature sensor within the environmental chamber;
    an air regulator and filter mounted between the source of pressurized gas and the first data acquisition module;
    a power supply; and
    a manifold assembly configured to be mounted within the environmental chamber, the manifold assembly comprising:
        a manifold frame;
        a manifold having a plurality of fluid conduits mounted to the manifold frame and connected to the source of pressurized gas, a gas line connector attached to an inlet end thereof and configured for attachment to a source of pressurized gas, and a pressure transducer attached to an outlet end thereof and configured to one of sense and measure gas pressure within the fluid conduits of the manifold; and
        a plurality of superheat controller fittings mounted to the fluid conduits, each superheat controller fitting configured to have a superheat controller attached thereto;
    wherein each superheat controller fitting is a male fitting having an O-ring mounted about an outside surface at an open end thereof, and wherein the O-ring defines a fluid tight seal between the superheat controller fitting and a sealing surface of a fluid inlet member of the superheat controller.

* * * * *